United States Patent [19]

Blais

[11] Patent Number: 4,991,911
[45] Date of Patent: Feb. 12, 1991

[54] TRACK CLEAT

[75] Inventor: Christian Blais, Sherbrooke, Canada

[73] Assignee: Bombardier Inc., Canada

[21] Appl. No.: 485,855

[22] Filed: Feb. 22, 1990

Related U.S. Application Data

[63] Continuation of Ser. No. 205,747, Jun. 13, 1988, abandoned.

[51] Int. Cl.⁵ .............................................. B62D 55/24
[52] U.S. Cl. ................................. 305/24; 305/35 EB; 305/16
[58] Field of Search .................... 305/16, 17, 18, 35 R, 305/35 EB, 38, 56, 24; 248/248

[56] References Cited

U.S. PATENT DOCUMENTS

| | | | |
|---|---|---|---|
| 576,110 | 2/1897 | Graves | 248/248 |
| 3,451,729 | 6/1969 | Roy | 305/38 |
| 3,887,243 | 6/1975 | Chaumont | 305/35 EB |
| 4,023,865 | 5/1977 | Morissette | 305/35 EB |
| 4,217,006 | 8/1980 | Dehnert | 305/56 |
| 4,474,414 | 10/1984 | Tokue | 305/38 |
| 4,546,842 | 10/1985 | Yasui | 305/35 EB X |

Primary Examiner—Russell D. Stormer
Attorney, Agent, or Firm—Larson & Taylor

[57] ABSTRACT

A guide clip for a snowmobile track belt is fabricated from sheet steel and has a body with downwardly extending limbs that define a profile of inverted U-shape, with an integral guide lug projecting upwardly from one end of the body. The guide lug extends across the full width of that end and is strengthened in the region thereof by a stamped bell-shaped depression. The lug tapers in width upwardly and is strengthened in its marginal region by being curved outwardly away from the plane of the lug to define a continuous rolled over edge on the lateral and upper regions of the lug.

5 Claims, 3 Drawing Sheets

TRACK CLEAT

This application is a continuation of application Ser. No. 07/205,747 filed Jun. 13, 1988, and now abandoned.

FIELD OF INVENTION

This invention relates to a new or improved guide clip or cleat for use in a snowmobile track belt, and to a track belt equipped with a series of such guide clips.

DESCRIPTION OF THE PRIOR ART

Snowmobile track belts are normally provided with a series of sheet metal clips extending at spaced intervals therealong in two transversely separated rows positioned to engage the undersides of the slide rails of the snowmobile suspension system in sliding bearing contact. Typically, these clips have a pair of spaced downwardly projecting limbs and are attached to the belt by having these limbs wrapped around and clinched to the rubber belt material surrounding a section of a transverse reinforcing rod. The clips may be separated by a series of longitudinally spaced apertures which are engaged by drive sprockets and idler sprockets in the snowmobile transmission system. To maintain the track belt in alignment with the suspension slide rails, it is usual to design some of the metal clips, e.g. every third or fourth clip, as a track guide clip. To this end the track guide clip is provided with an integrally formed upwardly projecting lug adapted to engage the side of the slide rail runner and prevent the track guide clip from moving laterally with respect thereto, and thus maintain the bearing sections of the track guide clips in alignment with the slide rails. Examples of such guide clips are shown inter alia in U.S. Pat. No. 3,887,243 Chaumont and U.S. Pat. No. 4,217,006 Dehnert. As a result of the very high stresses generated during fabrication and during installation and subsequent operation of these components they are subject to premature failure. Attempts to improve the performance of such track guide clips have been made as described for example in U.S. Pat. No. 4,474,414 Tokue. It has long been recognized that the major stress concentrations in track guide clips occur at the intersection between the lug and the attachment limb, and the common practice in the design of such clips has been to provide a notch at this location to avoid the distortion created during fabrication and mounting of the clip. However this has not proved to be satisfactory, and in the improved design disclosed in the Tokue patent referred to above, the notch is repositioned at a location spaced downwardly on the adjacent edge of the mounting limb in an attempt to avoid the generation of cracks in the lesion where the lug and the limb meet.

SUMMARY OF THE INVENTION

The present invention aims to provide an improved configuration of guide clip for a snowmobile track which will provide enhanced performance in terms of its durability and service life.

The invention provides a guide clip for a snowmobile track belt comprising: a body fabricated from sheet metal and having a central generally rectangular bearing portion which extends on its two longer sides into two opposed downwardly extending integral mounting limbs to define therewith a profile generally of inverted U shape, there being an integral guide lug projecting upwardly from one end edge of the bearing portion; wherein said guide lug extends across the full width of said end edge and is strengthened in the region thereof by a shallow L-shaped stamped depression the limbs of which extend into the adjacent regions of said bearing portion and said lug; said lug tapering in width upwardly from said end edge and being of generally planar form, said lug being strengthened by the marginal region thereof being curved outwardly away from the plane of the lug to define a continuous edge on the lateral and upper regions of the lug that is spaced outwardly from said plane; said continuous edge being outwardly offset from the adjacent end edge of each mounting limb and merging smoothly therewith through a continuously curved transition section.

BRIEF DESCRIPTION OF THE DRAWINGS

The invention will further be described by way of example only, with reference to the accompanying drawings wherein.

DESCRIPTION OF THE PREFERRED EMBODIMENT

Figure 1:
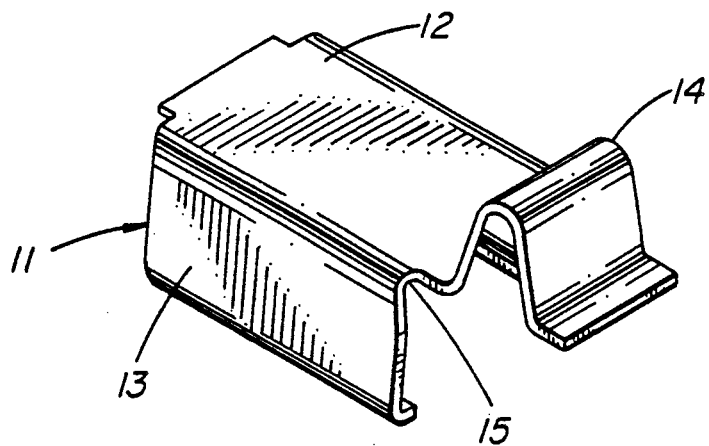
FIG. 1 is a perspective of a prior art guide clip for a snowmobile track.
Figure 2:
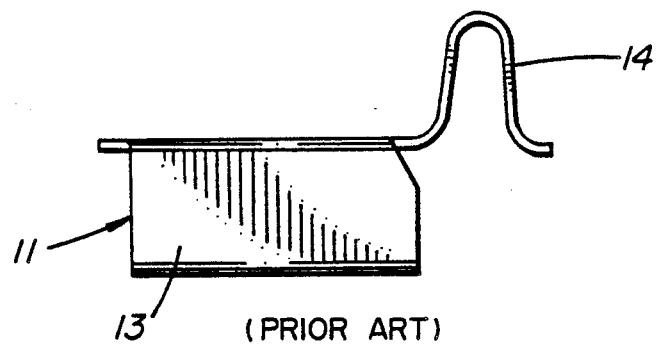
FIG. 2 is a side view of the guide clip of FIG. 1.
Figure 3:
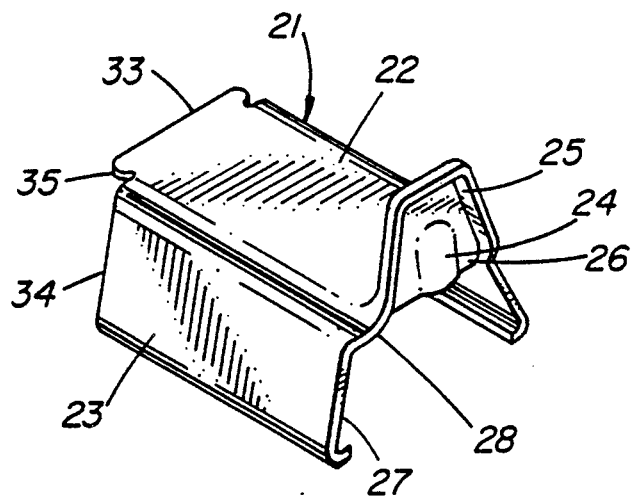
FIG. 3 is a perspective view of a guide clip in accordance with the invention.

FIGS. 1 and 2 show a typical prior art track guide clip 11 formed with a generally rectangular bearing portion 12 from opposite longitudinal sides of which depend curved rectangular mounting limbs or claws 13, and from one end of which projects a finger guide or lug 14. Such guide clips are typically manufactured from sheet steel such as AISI 4130 steel of hardness 28 to 30 Rockwell C and on the thickness of 1.6 mm. The guide clip is fabricated by stamping and cold forming in a number of successive operations. Upon installation, the bearing portion 12 is placed upon the surface of the snowmobile track in the region of the transverse reinforcing rod, and the mounting limbs 13 are clinched into the rubber surrounding the rod to provide a secure attachment for the clip. The stresses generated during fabrication and installation of the clip are quite high, particularly in the region where the root of the lug 14 adjoins the front edge of the mounting limb 13. It has been found that in this region shallow edge cracks frequently result from the fabrication and installation of the guide clip. It has been found in practice that these fabrication cracks become sites for potential fatigue, stress-corrosion, or corrosion-fatigue cracks which will ultimately result in failure of the component. To reduce the level of stress in this region, it is known in the prior art to provide a notch 15 in the form of a concave curved recess in the region where the lower edge of the lug 14 adjoins the edge of the mounting limb 13. While the provision of the notch 15 results in the improvement in the performance characteristics of the clip 11, nonetheless such clips are prone to premature failure in service as a result of cracks which originate in the region where the lug adjoins the mounting limb, and propagate either along the root of the lug, or along the region where the mounting limb adjoins the bearing portion 12. Particularly, in tracks where the drive is provided from a drive sprocket having teeth that enter into sprocket holes in the track provided between adjacent track clips, there is a tendency for cracks to propagate along the junction between the mounting limb 13 and the bearing portion 12.

Figure 6:
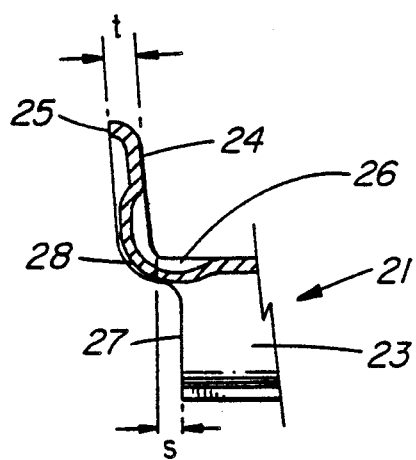
FIG. 6 is an enlarged fragmentary sectional view taken on the lines VI—VI in FIG. 5.

The design of track guide clip 21 shown in FIGS. 3 to 6 has been devised in an effort to improve the service life of this component and increase its resistance to premature failure through the propagation of cracks. To this end, the clip 21 is fabricated by stamping and cold forming as before from sheet steel of thickness 1.6 mm. Suitable materials are steels such as AISI 4130 or ASTNA-715 Grade 50. As before, the clip 21 is fabricated with a generally rectangular bearing portion 22 on the opposite sides of which are two downwardly extending integral mounting limbs 23, and one end of which has an upwardly projecting integral lug 24. As is evident from the drawings, the lug 24 tapers in the upwards direction, and while of generally planar form has a marginal region that is curved outwardly away from the plane of the lug to define a continuous edge 25 that is spaced from the plane of the lug. As shown in FIG. 6, the edge 25 is located such that the effective thickness t of the lug as seen in sideview is approximately twice the thickness of the material from which the clip is fabricated.

To further strengthen and stiffen the lug 24, an L-shaped shallow depression 26 is stamped extending over the adjoining regions of the bearing portion 22 and the lug 24.

Additionally, the front edge 27 of the mounting limb 23 is offset from the location where the lug 24 adjoins the bearing portion 22 of the clip by a distance s which is between 2.5 and 3 times the thickness of the sheet material from which the clip 21 is fabricated.

Additionally, the edge 25 of the lug is connected to the forward edge 27 of the mounting limb through a continuously curved transition section 28 which is formed without any notches or other irregularities therein.

The combined effect of these measures is that the stress in the reversely bent region of the transition section 28 is significantly reduced, providing a correspondingly enhanced durability for the component.

Figure 4:
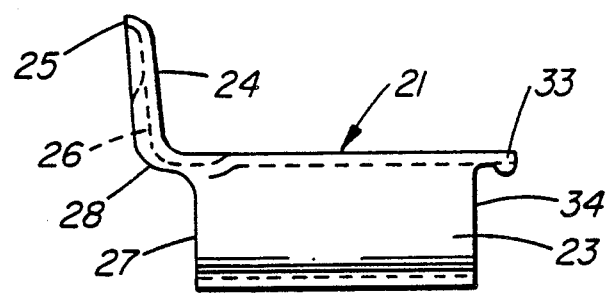
FIG. 4 is a side view thereof.
Figure 5:
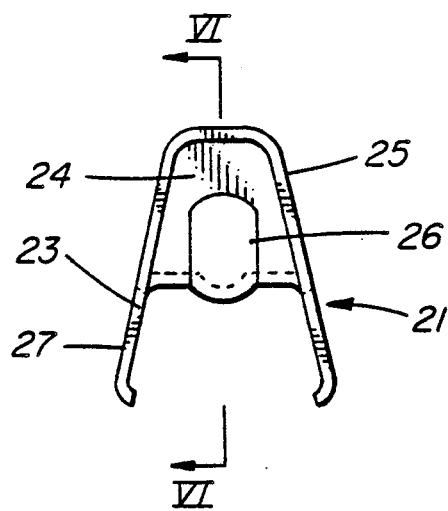
FIG. 5 is an end view thereof.

A projecting rectangular tab 33 is offset from the rear edges 34 of the limbs 23 and separated therefrom by concave notches 35. The notches 35 serve to isolate the tab 33 and the bearing portion 22 from the rear edges 34 so that no deformation from the latter is applied to the tab 33 and bearing portion 22 when assembling the guide clip 21 onto the track 30. The tips 36 of the tab 33 are lightly bent downwardly as seen in FIGS. 4 and 7 allowing the tab 33 to grip in the rubber of the track belt 30.

Figure 7:
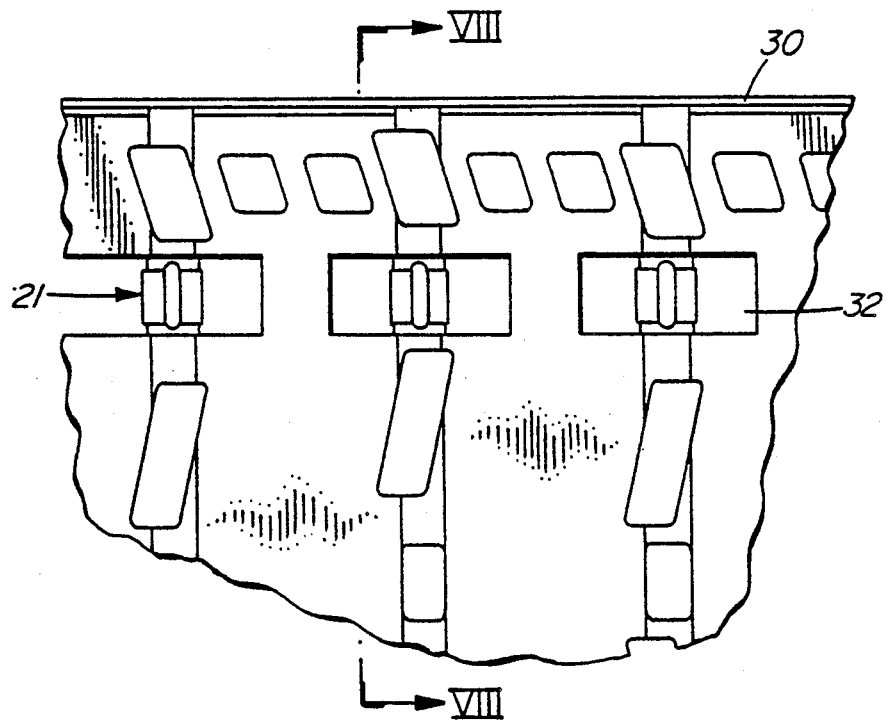
FIG. 7 is a fragmentary plan view showing the outer surface of a snowmobile track belt.
Figure 8:
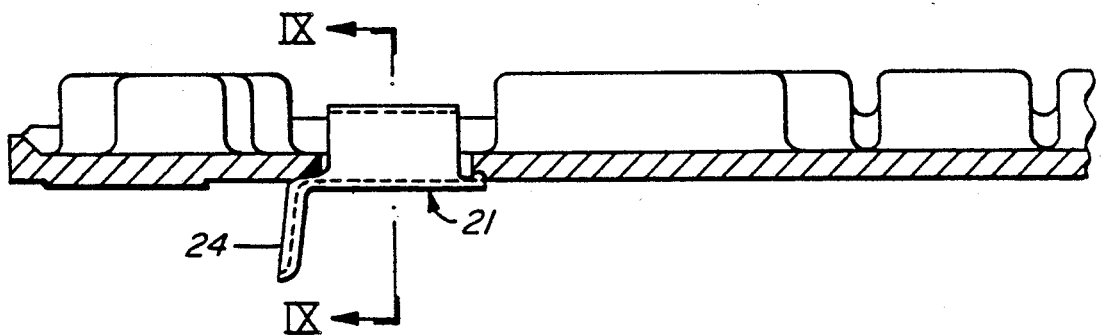
FIG. 8 is a sectional view taken on the line VIII—VIII in FIG. 7.
Figure 9:
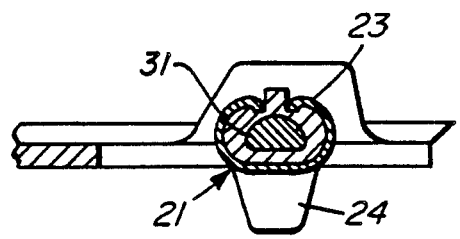
FIG. 9 is a sectional view taken on the line IX—IX in FIG. 8.

The installed condition of the clip 21 is illustrated in FIGS. 7, 8 and 9 wherein the mounting limbs 23 have been formed around and clinched into the rubber material of the track 30 surrounding the transverse reinforcing rod 31. The clip 21 is thus securely attached to the track with the lug 24 arranged and shown in FIGS. 8 and 9. It will be appreciated that by providing an adequate offset between the front edge 27 of the mounting limb and the root of the lug 24, the deformation of the mounting limbs 23 upon installation of the clip does not generate excessive forces in the region of the transition section 28, and therefore does not tend to initiate or propagate the formation of cracks in this region.

Where the clip 21 is designed for use in a track which is driven by sprocket wheels that have teeth engaging into sprocket holes 32 in the track 30, then the mounting limbs 23 form the flanks of the sprocket holes and are heavily loaded by the driving engagement of the sprocket wheel teeth.

The continuity of the rear edges 34 of the limbs 23 to the bearing portion 22, and of the forward edges 27 to the top of the lug 24 (there being no notches in this region) reduces the tendency for the driving engagement of the sprocket wheel teeth to generate cracks emanating from either end of the clip.

I claim as my invention:

1. A guide clip for a snowmobile track belt comprising:
    a body fabricated from sheet metal and having a central generally rectangular bearing portion which extends on its two longer sides into two opposed downwardly extending integral mounting limbs to define therewith a profile generally of inverted U shape, there being an integral guide lug projecting upwardly from one end of the bearing portion;
    wherein said guide lug extends across the full width of said end and is strengthened in the region thereof by a shallow L-shaped stamped depression the limbs of which extend into the adjacent regions of said bearing portion and said lug so as to be below the level of the upper surface of the bearing portion and the adjacent surface of the guide lug;
    said lug tapering in width upwardly from said end and being generally in a plane, said lug being strengthened by a marginal region thereof extending outwardly away from the plane of the lug to define a continuous edge on the lateral and upper regions of the lug that is spaced outwardly from said plane;
    said continuous edge outwardly offset from adjacent ends of each mounting limb and merging smoothly therewith through a continuously curved transition section, said end of each mounting limb, said transition section, and said continuous edge on the lateral region of the lug being smooth and uninterrupted by any notch.

2. A guide clip according to claim 1 wherein said continuous edge on the lug is spaced outwardly from the plane of the lug by a distance such that the effective thickness of lug in the marginal region is approximately three times the thickness of the sheet metal from which the clip is fabricated.

3. A guide clip according to claim 1 wherein said shallow stamped L-shaped depression has a depth that is less than half the thickness of said sheet metal.

4. A guide clip according to claim 3 wherein said depth is approximately one third of the thickness of the sheet metal.

5. A guide clip according to claim 1 wherein the end of the bearing portion opposite to the lug projects beyond the adjacent edges of the mounting limbs to define a tab, each side of the tab defining a curved concave notch where it meets the adjacent edge of the associated limb.

\* \* \* \* \*